(12) United States Patent
Broniek et al.

(10) Patent No.: US 8,713,438 B1
(45) Date of Patent: Apr. 29, 2014

(54) GATHERING USER FEEDBACK IN WEB APPLICATIONS

(75) Inventors: Przemysław Broniek, Kraków (PL); Joanna Chwastowska, Tarnów (PL); Ramy Dodin, Newport Beach, CA (US); Dawid Duda, Kraków (PL); Terence Haddock, Krakow (PL); Marcin Mikosik, Turek (PL); Maciej Molerus, Zabrze (PL); Michał Pociecha-Łoś, Kraków (PL); Jasiek Wróbel, Michałowice (PL)

(73) Assignee: Google, Inc., Mountain View, CA (US)

( * ) Notice: Subject to any disclaimer, the term of this patent is extended or adjusted under 35 U.S.C. 154(b) by 361 days.

(21) Appl. No.: 12/640,369

(22) Filed: Dec. 17, 2009

(51) Int. Cl.
*G06F 3/00* (2006.01)
*G06F 3/048* (2013.01)

(52) U.S. Cl.
USPC ............ 715/715; 715/810; 715/764; 715/760

(58) Field of Classification Search
USPC ......................................... 715/810, 764, 760
See application file for complete search history.

(56) References Cited

U.S. PATENT DOCUMENTS

| | | | | |
|---|---|---|---|---|
| 6,895,437 B1 * | 5/2005 | Cowdrey et al. | ............... | 709/224 |
| 7,085,820 B1 * | 8/2006 | Nickerson et al. | ............ | 709/219 |
| 7,426,533 B2 * | 9/2008 | Malone et al. | ................ | 709/203 |
| 7,587,678 B1 * | 9/2009 | English et al. | ................ | 715/752 |
| 7,827,487 B1 * | 11/2010 | Nickerson et al. | ............ | 715/711 |
| 8,078,979 B2 * | 12/2011 | Howard et al. | ................ | 715/760 |
| 2004/0030697 A1 * | 2/2004 | Cochran et al. | .................... | 707/9 |
| 2006/0253799 A1 * | 11/2006 | Montroy et al. | .............. | 715/809 |
| 2008/0092060 A1 * | 4/2008 | Berg et al. | ....................... | 715/748 |
| 2008/0141221 A1 * | 6/2008 | Benesovska et al. | ......... | 717/124 |
| 2009/0164494 A1 | 6/2009 | Dodin | | |
| 2009/0235236 A1 * | 9/2009 | Nickerson et al. | ............ | 717/128 |

OTHER PUBLICATIONS

SnapABug. <http://www.snapabug.com/>. Website downloaded Dec. 17, 2009.
Adweek. Brian Morrissey: "Miracle Whip Rolls Out Social App". <http://www.adweek.com/fdcp?1261074056420>. May 12, 2009.

* cited by examiner

*Primary Examiner* — Amy Ng
*Assistant Examiner* — Erik Stitt
(74) *Attorney, Agent, or Firm* — Birch, Stewart, Kolasch & Birch, LLP

(57) ABSTRACT

Methods and apparatus, including computer program products, implementing and using techniques for providing feedback with respect to a web page. A web page is displayed to a user in a web browser. The web page includes one or more page elements. An annotation mode is entered for the web page. The annotation mode enables the user to select and provide feedback pertaining to individual page elements on the web page. A user selection of one or more page elements on the web page is received. A marked-up web page is displayed to the user. The marked-up web page includes the one or more page elements selected by the user. Detailed information about the web page and a current state of the web page is automatically gathered. Feedback for the selected one or more page elements is received from the user. The user feedback and gathered detailed information is sent to one or more recipients.

18 Claims, 3 Drawing Sheets

GATHERING USER FEEDBACK IN WEB APPLICATIONS

BACKGROUND

This various implementations described herein relate to the development and review of web pages. A web page is a resource of information that is suitable for the World Wide Web (WWW). Typically web pages reside on a remote, publicly available web server and are accessed by client computers through a web browser. Web pages can also be stored on a local computer or on a web server that is restricted to a private network, such as a company's Intranet. The web pages are typically stored in Hypertext Markup Language (HTML) format, or in Extended Hypertext Markup Language (XHTML), and are requested by the clients using a Hypertext Transfer Protocol (HTTP).

Web pages typically contain many types of page elements, for example, hypertext links, which provide functionality allowing a user to navigate to other web pages. To create a web page, a text editor or a specialized HTML editor is used, and the completed web page is then uploaded to the web server by using some type of File Transfer Protocol (FTP) client, or other technology that is well-known to those of ordinary skill in the art. Web pages can have a widely varying design, which typically is decided by the person creating the web page. Some web page creators use predefined design templates, while others make their own designs from scratch. Web pages can be static or dynamic in nature. Static web pages do not allow any user interaction, except for navigating to, from, and within the web page itself. Dynamic web pages, on the other hand, often provide a high degree of user interactivity and can be used to present a user interface to live web applications. Some examples of such applications include word processors, calendars, hosted email programs, online spreadsheets, presentation tools, etc. These dynamic web pages are also often referred to as web applications or web application pages.

It is often desirable for web page creators to receive user feedback on the contents and appearance of their web pages, so that the web pages with which the user interacts can be further improved. However, there is no convenient mechanism available for users to provide such feedback. Often, a user must describe the problem to the web page creator (typically by way of email or by filling out a feedback form that is embedded in the web page) using words, or possibly using words in combination with a manually prepared and attached screenshot. In addition to this process being inconvenient for the user, it may also be difficult for the web page creator to understand the user's feedback.

SUMMARY

In one aspect, the various implementations provide methods and apparatus, including computer program products for providing feedback with respect to a web page. A web page is displayed to a user in a web browser. The web page includes one or more page elements. An annotation mode is entered for the web page. The annotation mode enables the user to select and provide feedback pertaining to individual page elements on the web page. A user selection of one or more page elements on the web page is received. A marked-up web page is displayed to the user. The marked-up web page includes the one or more page elements selected by the user. Detailed information about the web page and a current state of the web page is automatically gathered. Feedback for the selected one or more page elements is received from the user. The user feedback and gathered detailed information is sent to one or more recipients.

Some implementations can include one or more of the following features. The one or more recipients can be selected by the user. The one or more recipients can be automatically selected based on the received feedback. Selecting an individual page element can include highlighting the page element, or receiving free-hand markup from the user. Sometimes, only a subset of the page elements is selectable by the user in the annotation mode, based on a set of rules that apply to, for example, a classification of the user and/or the displayed web page. A user selection can be received that designates one or more page elements to be redacted from the web page prior to sending the feedback to the one or more recipients. Receiving feedback can include receiving the feedback in a window pane that is part of the web browser window in which the web page is displayed, receiving the feedback in a web browser window that is distinct from the web browser window in which the web page is displayed, or receiving the feedback in a form that is embedded in the web page.

Receiving feedback can include receiving an identification of a topic to which the feedback applies. Sending the feedback can include attaching a screenshot of the marked-up web page to the feedback. The detailed information can include a date, a time, a geolocation of the user, operating system information, a user name, or information about the web browser displaying the web page. The detailed information can include source code for the webpage, where the source code can be represented in a complete format or a pre-processed format. Sending the feedback can include sending the feedback to a remote server, storing the feedback in the server and/or the computing device used to display the web page, and performing one or more actions pertaining to the received feedback by the server. The one or more actions can include notifying a selected recipient by the server. All active page elements can be disabled when the annotation mode is entered.

Various implementations can include one or more of the following advantages. By having the ability to annotate and automatically attach screenshots, it is both easier for a user to provide feedback to a web application developer, and for the web application developer to understand the information the user is trying to convey in his feedback. By gathering multiple available pieces of information and attaching them to the feedback being sent, such as the address of the web page being visited, the language used, date and time, browser information, user geographical location, user identity (if allowed by the user) and the content of the page being viewed in both graphical as well as text (HTML, XML or other) format, it is possible to automatically classify and cluster incoming feedback, make it easier for the web application creators to process and understand the feedback, and make it possible to handle very large feedback volumes. In summary, the combination of easy selecting elements on the webpage and automatically gathering detailed information in the background makes the feedback gathering easy for the user, while at the same time generating reports of proper quality that are valuable for the application developer.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Overview

The present description provides methods and apparatus for marking page elements of a web page. Various implementations will be described herein with reference to tools and methods for submitting feedback to a web application creator or some other party of interest. As the skilled reader realizes, these examples are not intended to be exhaustive. On the contrary, the techniques and tools that will be described below can be used in a wide array of applications. Some examples include marking page elements in various software applications, for example, during development and testing of the software product; marking documents or images to identify specific parts or portions of interest, etc. Furthermore, while the various implementations will be described with respect to a general purpose computer, it should be clear that the same or similar techniques can be implemented on other types of computing devices such as PDAs (Personal Digital Assistants), mobile phones, etc. It should also be noted that while reference will be made below to web pages, these are intended to encompass not only static web pages but also dynamic web pages, that is, web pages where content may or may not change dynamically, as well as standalone desktop applications.

Example of a Feedback Process

Figure 1:
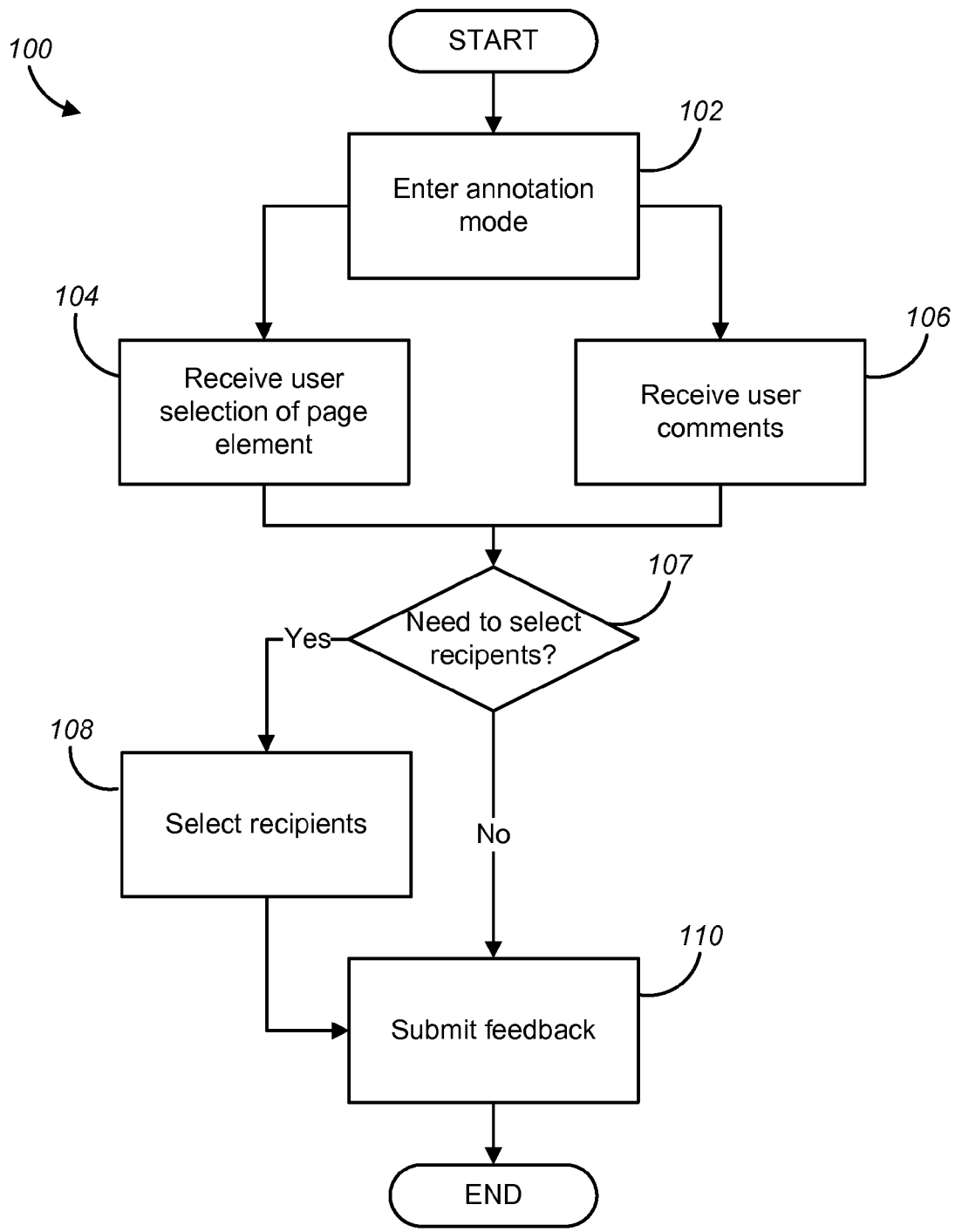
FIG. 1 shows a process (100) for providing feedback for a web page, in accordance with one implementation.
Figure 2:
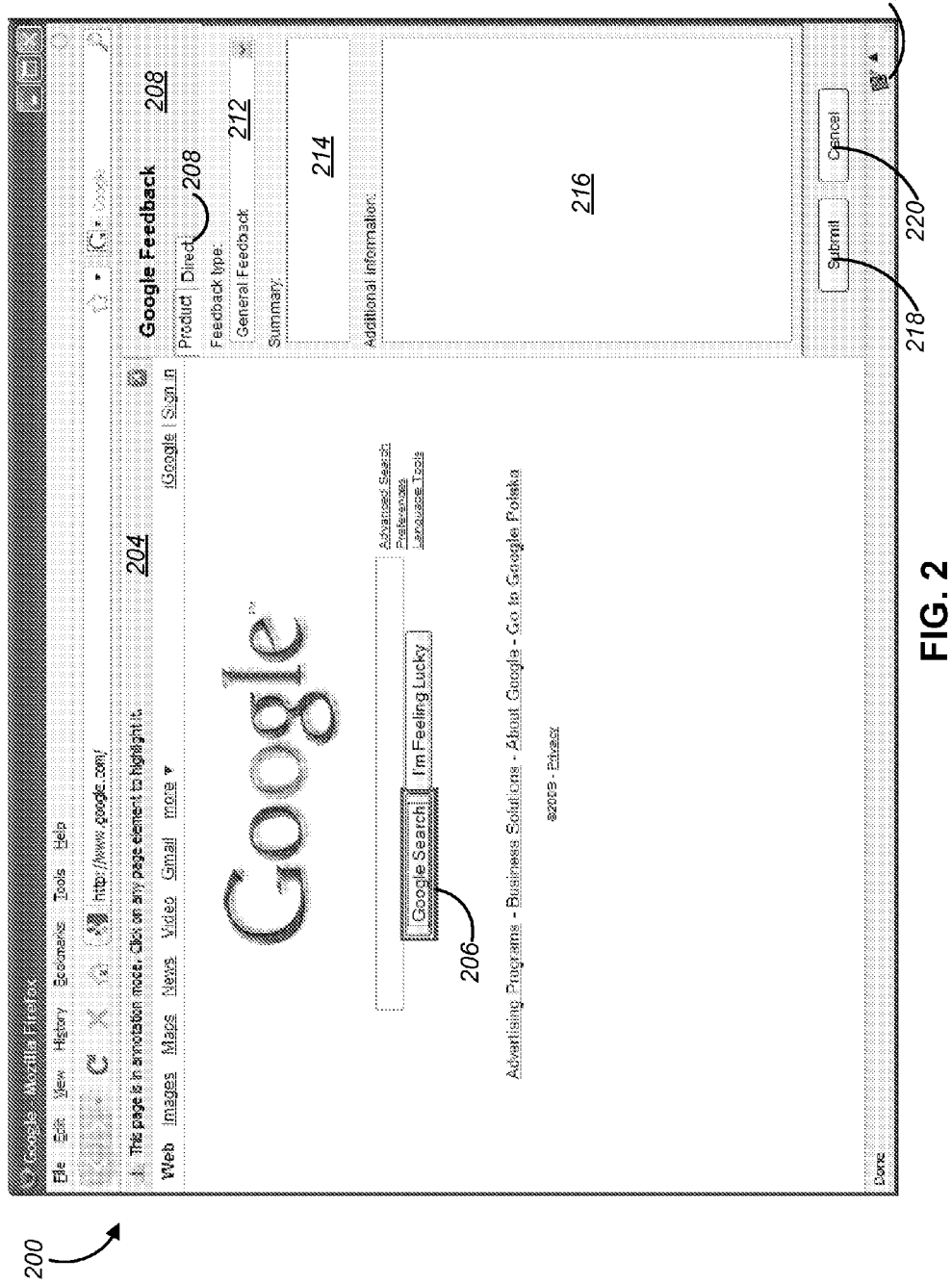
FIG. 2 shows a screenshot of a web browser (200) displaying a web page in annotation mode, in accordance with one implementation.

As shown in FIG. 1, a process (100) for providing feedback in one implementation starts by entering an annotation mode for the web page (step 102). In some implementations, the annotation mode can be entered, for example, in response to a user clicking an annotation icon (202) in the web browser (200), in which the web page is displayed, as shown in FIG. 2. This causes a feedback panel (208) to be displayed. A message (204) is shown to the user close to the top of the browser window to inform the user that the page is in the annotation mode. In some implementations, the annotation mode causes the web page to be made inactive, that is, not allowing the user to follow any links or to perform any other actions, such as clicking on a button on the web page. Instead, the user is allowed to mark web page elements. In order to achieve this, all the active web page elements are being temporarily disabled. In some alternative embodiments, a static screenshot of the page can be created and the screenshot can be used to gather user markings and comments.

A user selection of a page element on the web page is then received (step 104), as follows. A selectable page element in this context can include, for example, a subtree in the web page tree as defined by a DOM (Document Object Model) structure of the web page, or a free form selection of any area of the rendered web page. In some implementations, users can mark both kinds of page elements, either by clicking on a pre-highlighted structural element, or by dragging the cursor (similar to what is done in drawing programs) to mark free form selections. When the web page is in annotation mode, a user can select different page elements on the page. In some implementations the page structure is analyzed to allow various page elements to be automatically highlighted when the user "mouses over" the page elements. The page elements can then be selected when the user clicks with the mouse (or similar pointing device) on a currently highlighted page element. As the skilled reader realizes, highlighting can include a range of ways of visually marking a page element, such as drawing borders around the page element, change a background color for the page element, changing the color of a page element, etc. The selection identifies the page element on the web page to which the user's comments applies. FIG. 2 shows, for example, how a button (206) labeled "Google Search" has been selected. It should be noted that several page elements may be selected in the event that the same comment will apply to multiple page elements on the page.

In some implementations, the user is only permitted to mark a subset of page elements rather than any page elements on the web page. The subset of page elements can be defined, for example, based on a predefined configuration or on particular actions that must be performed by the user before entering the annotation. As a result of the configuration or the actions, in the annotation mode only some page elements specific to the user's purpose will be made markable. For example, if the purpose is to gather feedback about the quality of web search, the user may only be able to select the individual search results (or a group of search results) on the web page that displays the search results. Another scenario can be that marking is enabled only for elements that are important in the context of a recent user action. For example, the user may be allowed to make comments about a button for activating a particular functionality, but only if the user has actually used it, perhaps within a certain time frame. In different implementations those page elements may or may not be visually marked. Some implementations also allow the user to redact page elements from the web page. This can be useful, for example, in cases where some information should be kept confidential, such as the user's bank account numbers or passwords, etc.

When the user has selected the page elements to which the comments/feedback pertains, the user enters the comments into the feedback panel (208) (step 106). It should be noted that while the feedback panel (208) is already displayed in this embodiment, in other embodiments, the feedback panel may not be displayed until after the user has marked the page elements. It should further be noted that while the feedback panel (208) is displayed on the right hand side of the web browser (200), in various implementations, the feedback panel (208) can be displayed essentially anywhere in the web browser (200), or even as a separate web browser window or under a separate tab in the browser. In some implementations, e.g., for standalone applications, the feedback panel (208) can even be displayed outside the web browser window. In some implementations, the user is not required to mark specific page elements, as described in step 104, but can instead provide general comments about the web page, as described in step 106.

The implementation of the feedback panel (208) shown in FIG. 2 contains several areas. A set of tabs (210) allows the user to select to whom the feedback should be sent. For example, if the user selects the "Product" tab, the feedback will be automatically submitted to the owners/developers of the web page. If the user instead selects the "Direct" tab, the feedback can be sent to anyone selected by the user, such as the user's coworkers or friends, for example. In some implementations, a recipient of the feedback is selected automatically, for example, depending on the page to which the feedback pertains, or depending on to whom the particular user is allowed to submit feedback.

Below the set of tabs (210) is a drop-down menu (212) that contains a set of feedback types, from which the user can select a topic for the feedback. Some examples of feedback types include "General Feedback" (for providing general comments about the web page), "Feature request" (for requesting additional or enhanced features on the web page), "Broken Link" (for reporting links that do not work properly), "Better Translation" (for suggesting improved translations of certain words or phrases on the web page), etc. In some implementations, the available feedback types depend on the displayed web page. That is, the available types of feedback depend on the URL (Universal Resource Link), on the content of the displayed page, or on any other information related to the web page that may be relevant as to what types of feedback should be available for the user. For example, for pages containing advertisements that automatically populated on the page, it is possible for a user to provide a content quality report or a policy violation for the advertisements. In some implementations, the user may also provide his own feedback type, rather than selecting predefined topics from the drop-down menu (212). Below the drop-down menu (212) is a Summary field (214), in which the user can type in a brief summary of their comments. In many instances this may be sufficient. However, if the user wants to make extensive comments, a field for additional comments (216) is provided, into which the user can type further information. Finally, at the bottom of the feedback pane (208), there are two buttons, one button (218) for submitting the feedback, and one button (220) for canceling the feedback.

In some implementations, there are additional features that allow the user to provide extended comments. For example, there can be a set of checkboxes with various options that a user can select. The checkboxes can for example allow the user to automatically attach a screenshot of the web page, and/or attach information about the web browser (200) in which the web page is displayed. This can assist the recipients of the feedback to determine whether the issue brought up by the user is a browser-specific problem, or whether the issue is a general problem that occurs in any web browser.

Returning now to FIG. 1, after the user has entered comments as described above, it is determined whether the user needs to specify the recipients prior to sending the feedback (step 107). This determination is typically made based on the settings and permissions for the user described above. If it is necessary for the user to specify recipients, the process continues to step 108, where the user selects one or more recipients for the comments, for example by using the tabs (210). If the recipients are determined automatically, for example, based on the URL of the web page being viewed, based on the type of feedback selected by the user, or based on the content of the feedback itself, the process continues directly to step 110. Finally, the user clicks the submit button (218) to submit the feedback (step 110) and the process (100) ends. It should be noted that in some implementations, additional detailed information about the web page and its current state can also be gathered and included when the feedback is submitted. Such feedback metadata can include, for example, date, time, geographic location information for the user, operating system information, username (provided that the user has agreed to share this information), source code for the web page, which can be in a full format or in some kind of pre-processed format, etc.

Figure 3:
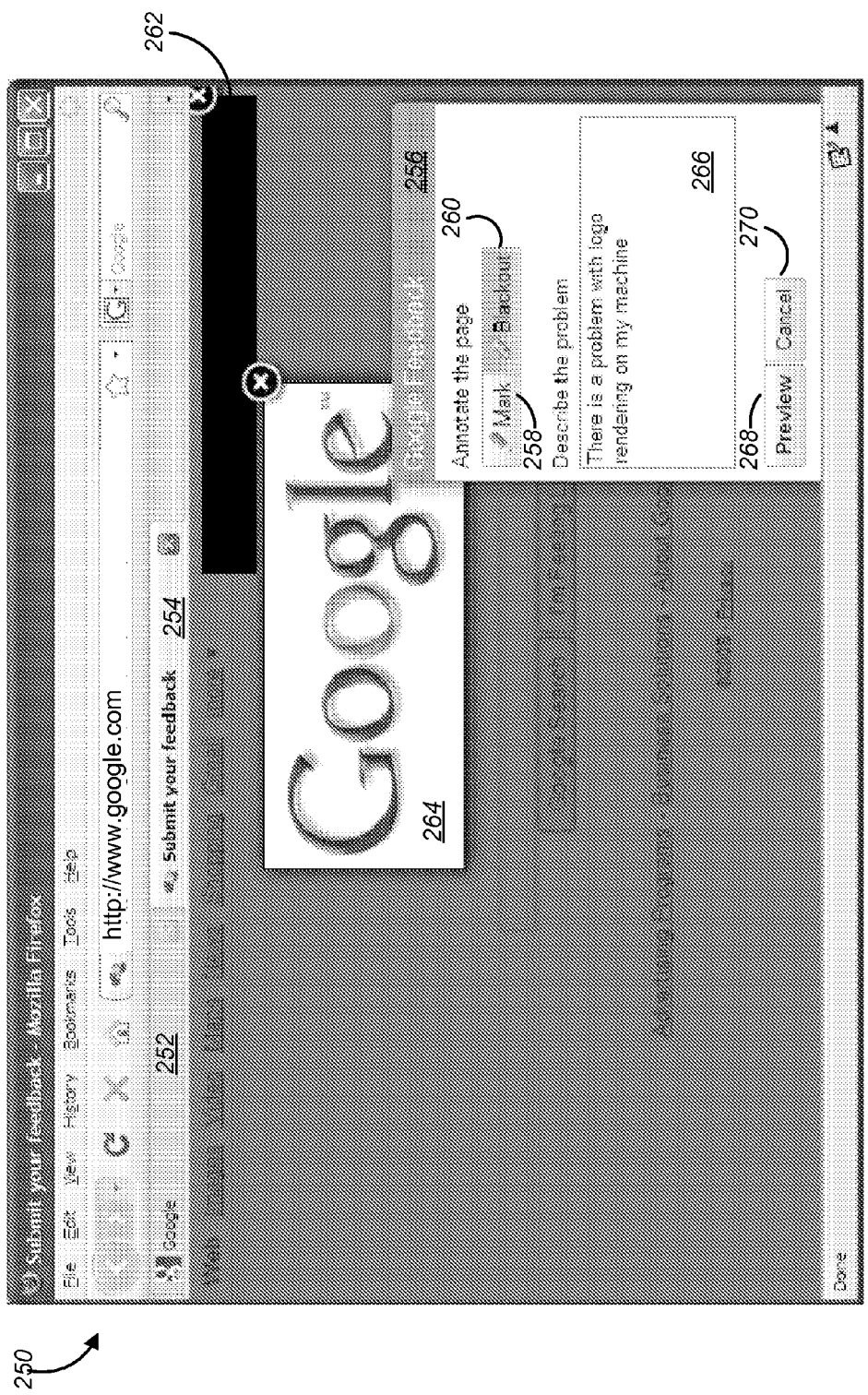
FIG. 3 shows a screenshot of a web browser (250) displaying a web page in annotation mode, in accordance with one implementation.

FIG. 3 shows a web browser (250) in which feedback can be provided in accordance with another implementation. As can be seen in FIG. 3, a first tab (252) contains the web page, in this case a web page titled "Google." When the user enters the annotation mode, as described above, a new tab (254) is opened, which displays the original page in the annotation mode. In FIG. 3, this tab is labeled "Submit your feedback." The feedback panel is displayed as a separate window (256), and contains a button (258) allowing the user to mark page elements and a button (260) allowing the user to blackout page elements.

The blackout feature can be used, for example, to hide personal details such as usernames, account numbers, etc., prior to submitting the feedback, as shown for page element 262 in FIG. 3. The marking feature is used in the same way that was described above.

Included in the feedback panel (256) is also an annotation field (266), into which the user can enter comments pertaining to the selected page element, in this case the Google logo (264), as shown in FIG. 3. Finally, two buttons (268, 270) at the bottom of the feedback panel (256) allow the user to preview the feedback prior to sending it, and to cancel the feedback, respectively, should the user change his mind.

Implementation Details for the Feedback Process

The above process (100) can be implemented, for example, as a web browser extension, in combination with a feedback server. The web browser extension and the feedback server can communicate in a conventional manner through a wired or wireless network, or a combination thereof, as is well known to those of ordinary skill in the art. In this implementation, the user interacts with the web browser extension through the web browser, to perform the above-described steps. In some implementations, it may be advantageous for the web browser extension to be as generic as possible and obtain information from the feedback server. The feedback server can provide the web browser extension with a list of feedback types. The feedback types can be based on, for example, different information gathered by the extension, such as the page URL or the page content.

In one implementation, the server includes a set of rules. The rules define for which web pages a particular type of feedback can be collected, using various conditions on the URL for the web page, as well as the current web page content when entering the annotation mode. It should be noted that there is a wide range of possible implementations. For example, there may be a predefined static list of options for the particular web page, and/or a set of options defined for a particular user or category of users, etc.

After the user chooses the type of feedback to be submitted, as described above, the extension may take a screenshot of the current page (provided that the user has decided to include a screenshot with the feedback), automatically gather all the required information, such as browser information, and send the complete feedback to the feedback server. In some implementations, after sending the feedback to the feedback server, the user is presented with an option to disable the annotation mode and continue his work, or to be taken to a dedicated web page (served by the feedback server) presenting the feedback he has just submitted.

In some implementations, the feedback server can also perform various other tasks, in addition to communicating with the web browser extension. As was described above, the feedback server can act as a backend for the web browser extension. That is, the feedback server can provide feedback type metadata, such as various permissions and rules, provide pages for feedback input, or even provide the complete user interface. The feedback server can also store user feedback in a feedback database, and forward the feedback information to external services where the feedback information can be stored, aggregated, or otherwise processed. The feedback in the feedback database can also be used to provide suggestions to the user about solutions to already known problems, i.e., problems that have already been reported by other users, or otherwise been identified. Typically these additional operations depend on the configuration for a given type of feedback. The feedback server may also provide a web interface for a feedback database.

For each feedback, there is a set of actions that can be performed, for example, forwarding the feedback as an email message. These actions can be triggered manually through the web interface, for example, by the owners of the type of the feedback (i.e., the users) or can be invoked automatically by the feedback server upon receipt of a specific type of feedback. In some implementations, the feedback server can offer a possibility to define modules providing different actions that feedback owners may want to perform on the feedback being submitted. This allows a flexible solution, in which new actions can be added easily and feedback owners can trigger (automatically or manually) all available actions.

Alternatives and Further Implementation Details

Various implementations can be made in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Various implementations can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the various implementations can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network. The above-described devices and materials will be familiar to those of skill in the computer hardware and software arts.

It should be noted that the various implementations described herein employ computer implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part are useful machine operations. The manipulations performed are often referred to in terms, such as, producing, identifying, running, determining, comparing, executing, downloading, or detecting.

A number of implementations have been described. Nevertheless, it will be understood that various modifications may be made. For example, the user does not necessarily have to type in the feedback information. In some implementations, the user can instead record an audio file with spoken comments and place the audio file in the Summary section (214) or Additional information section (216). In some implementations, instead (or in addition to) attaching an audio file, there may be audio recording functionality enabled from the extension, which allows the user to mark one or more page elements, comment on them, and press the "send" button. The sound can then be further processed, for example, to convert the audio into text in order to speed up and making the feedback processing more automated.

The techniques described above can also be used by a third party (e.g., web developers, portals, etc.) as a feedback gathering service that allows them to gather users' opinions about their services. Of course, the feedback mechanisms described above do not necessarily have to be implemented as web browser extensions. In some implementations, the website developer may install a button or some other kind of widget that the user can click on to enable the feedback mechanisms for the particular website, without actually having a browser extension installed in her own web browser. In some implementations, the feedback mechanisms described above can also be used in an offline mode. That is, the user can provide feedback about a web page after having been disconnected from the Internet, and then upon reconnection, the feedback is sent to the appropriate party or parties, as described above.

The techniques described above can also be used by users to create private "web history albums," that allow the users to save screenshots of web pages they have visited. The user can also add notes, as described above, for example, to preserve notes related to web pages that are important for them or to web pages the users would like to refer to in the future. Accordingly, other implementations are within the scope of the following claims.

The invention claimed is:

1. A computer-implemented method comprising:
providing, by a computing device, for display, a web page in a web browser, the web page comprising one or more page elements, the one or more page elements including one or more active elements that are each associated with a respective action;
entering, by the computing device, an annotation mode for the web page, wherein entering the annotation mode comprises disabling, by the computing device, the one or more active elements of the web page, such that the respective action associated with each of the one or more active elements cannot be performed, wherein the annotation mode enables a user to provide feedback pertaining to individual ones of the one or more page elements on the web page;

receiving, by the computing device and while the web page is in the annotation mode, a user input to indicate one or more of the one or more page elements on the web page;

providing, by the computing device, for display, and while the web page is in the annotation mode, a marked-up version of the web page, wherein in the marked-up version of the web page, the one or more page elements indicated by the user input are marked;

receiving, by the computing device, feedback from the user pertaining to the one or more page elements indicated by the user input; and sending, by the computing device and to a remote server, the feedback pertaining to the one or more page elements indicated by the user input.

2. The method of claim 1, further comprising receiving, by the computing device, a user selection of one or more recipients of the feedback pertaining to the one or more page elements indicated by the user input.

3. The method of claim 1, further comprising automatically selecting, by the computing device and based on the feedback pertaining to the one or more page elements indicated by the user input, one or more recipients of the feedback pertaining to the one or more page elements indicated by the user input.

4. The method of claim 1, wherein receiving the user input to indicate the one or more of the one or more page elements comprises one or more of: receiving, by the computing device, input to highlight the one or more of the one or more page elements; and receiving, by the computing device, free-hand markup from the user.

5. The method of claim 1, wherein only a subset of the one or more page elements is indicatable by the user while the web page is in the annotation mode, the subset being based on a set of rules that apply to one or more of: a classification of the user; and the web page as displayed.

6. The method of claim 1, wherein the user input is a first user input and the method further comprises receiving, by the computing device, a second user input, the second user input being to indicate at least one of the one or more page elements to be redacted from the web page prior to sending, to the remote server, the feedback pertaining to the one or more page elements indicated by the user input.

7. The method of claim 1, wherein receiving the feedback pertaining to the one or more page elements indicated by the user input includes one or more of:
receiving, by the computing device, the feedback pertaining to the one or more page elements indicated by the user input in a window pane that is part of a first web browser window in which the web page is displayed;
receiving, by the computing device, the feedback pertaining to the one or more page elements indicated by the user input in a second web browser window that is distinct from the first web browser window in which the web page is displayed; and
receiving, by the computing device, the feedback pertaining to the one or more page elements indicated by the user input in a form that is embedded in the web page.

8. The method of claim 1, wherein receiving the feedback pertaining to the one or more page elements indicated by the user input further includes:
receiving, by the computing device, an identification of a topic to which the feedback pertaining to the one or more page elements indicated by the user input applies.

9. The method of claim 1, wherein sending the feedback pertaining to the one or more page elements indicated by the user input includes:
attaching, by the computing device, a screenshot of the marked-up version of the web page to the feedback pertaining to the one or more page elements indicated by the user input.

10. The method of claim 1, wherein sending the feedback pertaining to the one or more page elements indicated by the user input includes sending the feedback pertaining to the one or more page elements indicated by the user input to the remote server, such that the remote server is enabled to perform one or more actions pertaining to the feedback pertaining to the one or more page elements indicated by the user input.

11. The method of claim 10, wherein the one or more actions include notifying a selected recipient.

12. A computer program product, stored on a machine-readable storage device and comprising instructions operable to cause a computer to:
provide for display of a web page in a web browser, the web page comprising one or more page elements, the one or more page elements including one or more active elements that are each associated with a respective action;
enter an annotation mode for the web page, wherein when entering the annotation mode the computer disables the one or more active elements of the web page such that the respective action associated with each of the one or more active elements cannot be performed, wherein the annotation mode enables a user to provide feedback pertaining to individual ones of the one or more page elements on the web page;
receive, while the web page is in the annotation mode, a user input to indicate one or more of the one or more page elements on the web page;
provide for display, while the web page is in the annotation mode, a marked-up version of the web page, wherein in the marked-up version of the web page, the one or more page elements indicated by the user input are marked;
receive feedback from the user pertaining to the one or more page elements indicated by the user input; and
send, to a remote server, the feedback pertaining to the one or more page elements indicated by the user input.

13. An apparatus comprising:
a programmable processor configured such that the apparatus:
provides for display of a web page in a web browser, the web page comprising one or more page elements, the one or more page elements including one or more active elements that are each associated with a respective action;
enters an annotation mode for the web page, wherein when the web page enters the annotation mode, the programmable processor disables the one or more active elements of the web page such that the respective action associated with each of the one or more active elements cannot be performed, wherein the annotation mode enables a user to provide feedback pertaining to individual ones of the one or more page elements on the web page;
receives, while the web page is in the annotation mode, a user input to indicate a first set of one or more of the page elements on the web page;

receives, while the web page is in the annotation mode, a user input to indicate a second set of one or more of the page elements on the web page;

provides for display, while the web page is in the annotation mode, a marked-up version of the web page, wherein in the marked-up version of the web page, the first set of one or more page elements are marked and the second set of one or more page elements are obscured;

receives feedback from the user pertaining to the first set of one or more page elements; and sends, to a remote server, the feedback pertaining to the first set of one or more page elements and a screenshot of the marked-up web page.

14. The method of claim 1, further comprising:

automatically gathering, by the computing device, information about the web page and a current state of the web page; and sending, by the computing device, the information to the remote server.

15. The computer program product of claim 12, wherein the instructions are further operable to cause the computer to:

automatically gather information about the web page and a current state of the web page; and send the information to the remote server.

16. The apparatus of claim 13, wherein the programmable processor is further configured such that the apparatus:

automatically gathers information about the web page and a current state of the web page; and sends the information to the remote server.

17. The method of claim 15, wherein the information about the web page and the current state of the web page includes one or more of: a date; a time; a geolocation of the user; operating system information; a user name; and information about the web browser.

18. The method of claim 15, wherein the information about the web page and the current state of the web page includes source code for the web page, the source code being represented in one of: a complete format and a pre-processed format.

* * * * *